US006791543B2

(12) United States Patent
Kawanaka

(10) Patent No.: US 6,791,543 B2
(45) Date of Patent: Sep. 14, 2004

(54) FORMING METHOD FOR STRUCTURING POLYGONAL MESH DATA AND APPARATUS, AND STORAGE MEDIUM

(75) Inventor: Akira Kawanaka, 2-30-6, Inokashira, Mitaka-shi, Tokyo (JP)

(73) Assignees: Akira Kawanaka, Mitaka (JP); Waro Iwane, Sapporo (JP)

( * ) Notice: Subject to any disclaimer, the term of this patent is extended or adjusted under 35 U.S.C. 154(b) by 0 days.

(21) Appl. No.: 09/818,641

(22) Filed: Mar. 28, 2001

(65) Prior Publication Data

US 2002/0063707 A1 May 30, 2002

(30) Foreign Application Priority Data

Sep. 27, 2000 (JP) ........................................ 2000-294865

(51) Int. Cl.[7] ............................................. G06T 15/30
(52) U.S. Cl. ............................................................. 345/423
(58) Field of Search ........................................ 345/423

(56) References Cited

U.S. PATENT DOCUMENTS 6,078,331 A * 6/2000 Pulli et al. .................. 345/423
6,342,884 B1 * 1/2002 Kamen et al. .............. 345/423

FOREIGN PATENT DOCUMENTS

JP  09-171568 A  6/1997

OTHER PUBLICATIONS

Deering, "Geometry Compression," Proceedings of the 22nd annual conference on Computer Graphics and Interactive Techniques, pp. 13–20, 1995.

Taubin, et al., "Geometry Coding and VRML", Proceedings of IEEE, vol. 86, No. 6, pp. 1228–1243, 1998.

Takayuki Kawashima et al., "Geometrical Data Compression with Structuring the Polygonal Mesh", Faculty of Science and Technology, Sophia University.

Eiichi Inoue et al., "Compression of 3D Shape Data using SA–WT", 1999 IEEE International Conference on Image Processing, 27AP3.1, 1999.

Henry Sowizral, et al., "The JAVA 3D API Specification", pp. 379–412.

* cited by examiner

Primary Examiner—Mark Zimmerman
Assistant Examiner—Adam Arnold
(74) Attorney, Agent, or Firm—Burns, Doane, Swecker & Mathis, L.L.P.

(57) ABSTRACT

A structured polygonal mesh data forming method approximates a 3D surface shape with a polygonal mesh constituted by a plurality of polygons and forms 2D structured data applicable of efficient compression/decompression from predetermined information concerning the polygonal. Polygon vertices as the vertices of the polygonal mesh are assigned to nodes as lattice points (triangular lattice including extension nodes) on a 2D coordinate system. 2D structured data is formed by geometric data consisting of the position coordinate data of the respective assigned polygon vertices, texture data including color information, and a connectivity map as information about connection between the respective polygons. When a polygon vertex is assigned to a plurality of nodes, and connected nodes are to be formed on the 2D coordinate system, one representative node is selected from the nodes. Nodes other than the representative node are represented by positions relative to the representative node.

19 Claims, 30 Drawing Sheets

Block diagram of the encoder and decoder

POLYGONAL DISPLAY

WIRE FRAME DISPLAY

WIRE FRAME DISPLAY

POLYGONAL DISPLAY

WIRE FRAME DISPLAY

POLYGONAL DISPLAY

Block diagram of the encoder and decoder

[ . ] : vertex number
( . , . ) : coodinate location

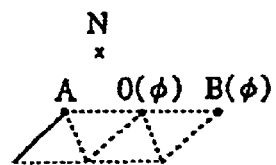
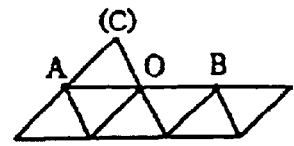
FIG. 12A    FIG. 12B
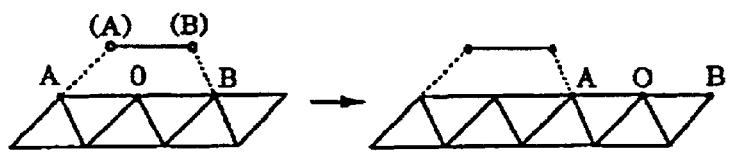
FIG. 12C

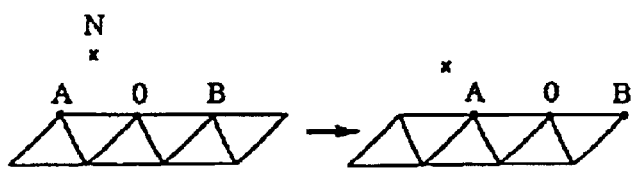
FIG. 12E

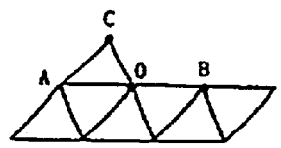
F I G. 15A
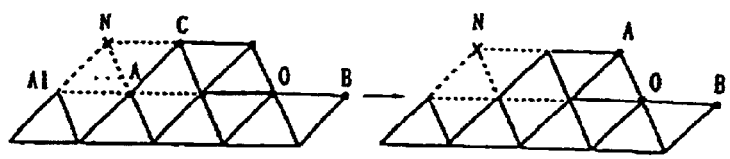
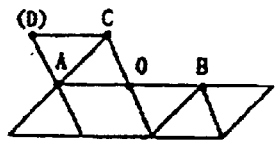
F I G. 15B
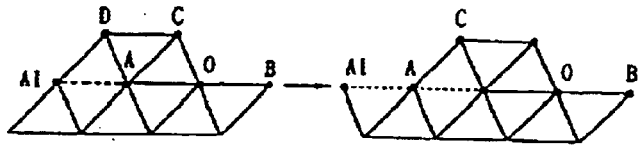
F I G. 15C
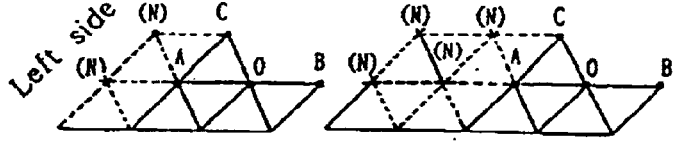
F I G. 15D
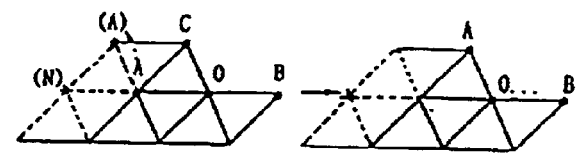
F I G. 15E
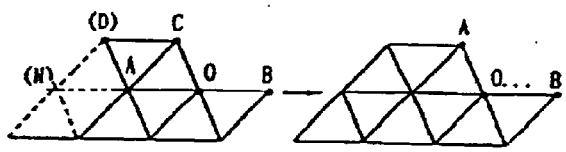
F I G. 15F
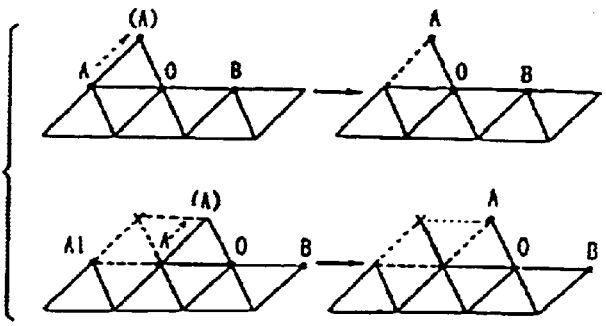
F I G. 15G

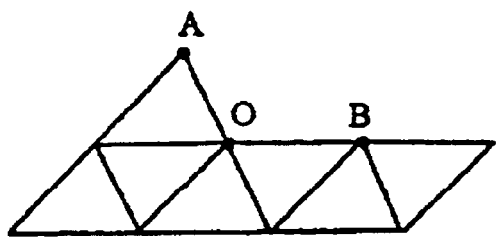 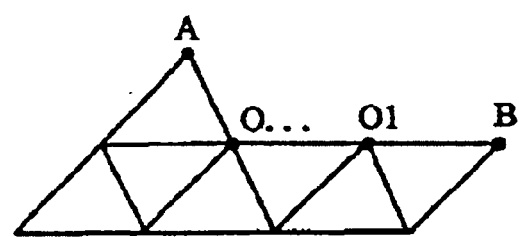
F I G. 16A  F I G. 16B

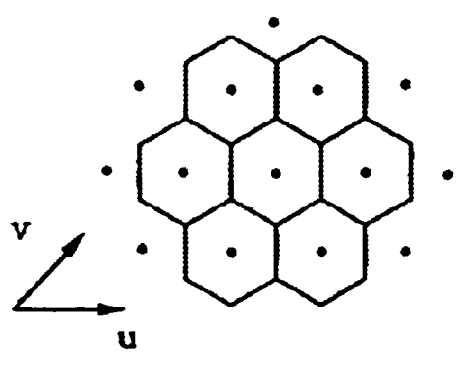 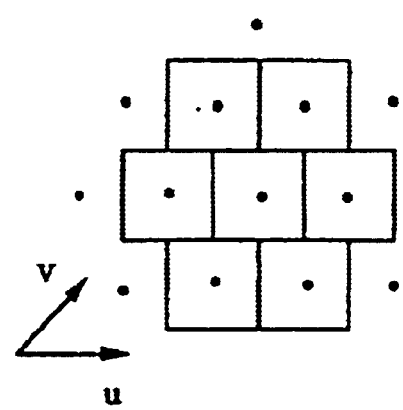
HEXAGONAL ELEMENT
REPRESENTATION
RECTANGULAR ELEMENT
REPRESENTATION
F I G. 19A
F I G. 19B

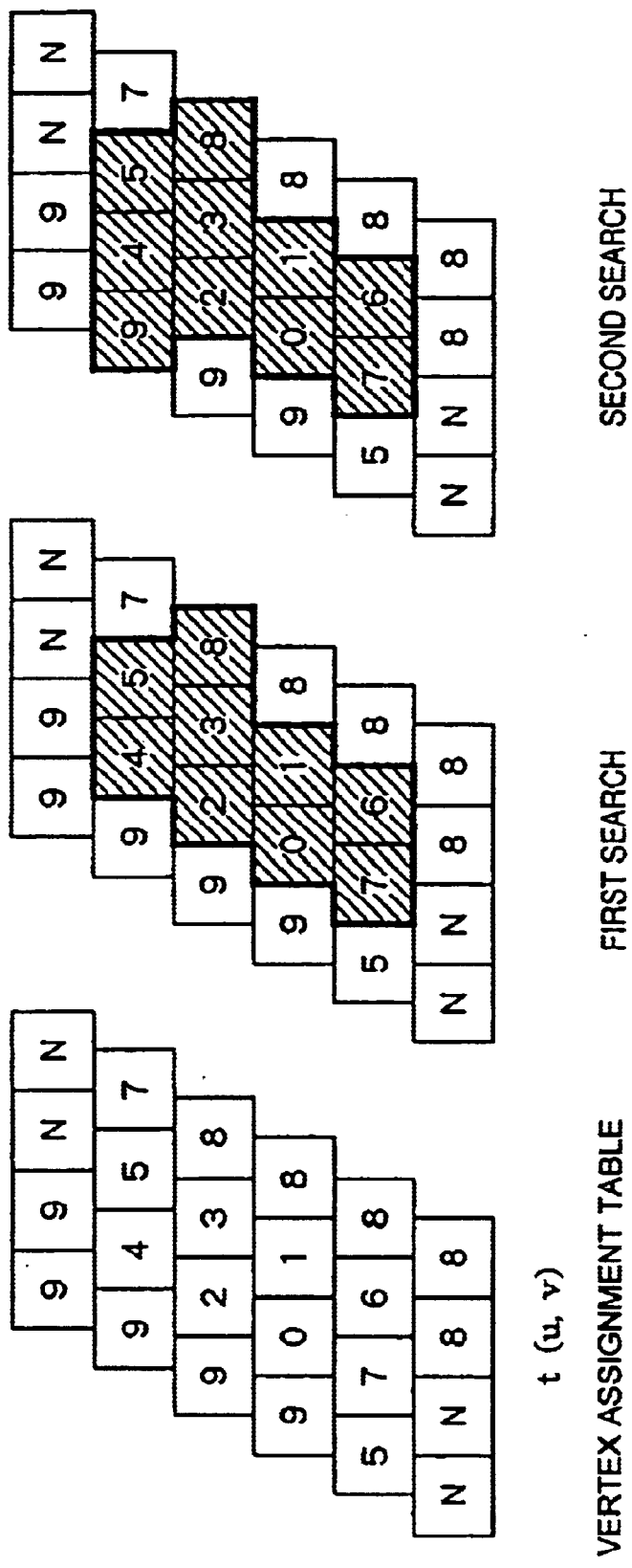
F I G. 20A  VERTEX ASSIGNMENT TABLE  t (u, v)
F I G. 20B  FIRST SEARCH
F I G. 20C  SECOND SEARCH

DIRECTIVITY SYMBOL

EXAMPLE OF SYMBOLIZATION OF EXTENSION NODES

FIG. 23A

| DL | R | N | N |
|----|---|---|---|
| C  | C | C | S |
| UR | C | C | C |
| UR | C | C | UR |
| S  | C | C | UR |
| N  | N | R | UR | v ↕, u →

CONNECTIVITY MAP

FIG. 23B

| REPRESENTATIVE NODE POSITION |
|---|
| (1 , 1) |
| (2 , 4) |

SEPARATE AREA INFORMATION
(REPRESENTATIVE NODE POSITION
OF NODE HAVING S THAT APPEARS
IN RASTER SCANNING)

GEOMETRIC DATA
$r_i = (x_i, y_i, z_i)$

TEXTURE DATA
$t_i = (r_i, g_i, b_i)$

FLOW OF STRUCTURE DATA CODING

FLOW OF RECONSTRUCTION OF POLYGONAL MESH DATA

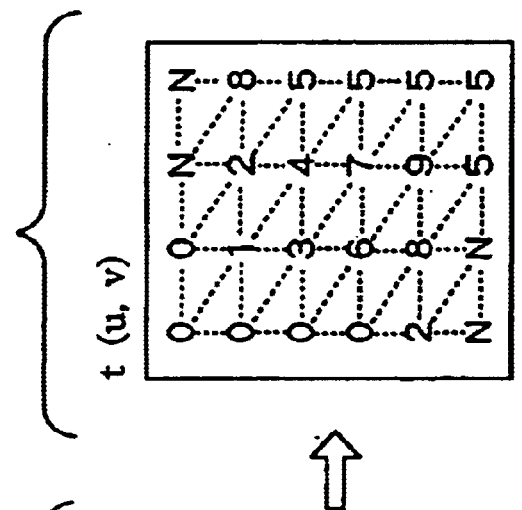

FIG. 28A $r_0$  $r_1$  $r_2$
     $r_3$  $r_4$  $r_5$
     $r_6$  $r_7$
     $r_8$  $r_9$

GEOMETRIC DATA
$r_i = (x_i, y_i, z_i)$

FIG. 28B $t_0$  $t_1$  $t_2$
     $t_3$  $t_4$  $t_5$
     $t_6$  $t_7$
     $t_8$  $t_9$

TEXTURE DATA
$t_i = (r_i, g_i, b_i)$

FIG. 29

| CONNECTIVITY LIST | GEOMETRIC AND TEXTURE |
|---|---|
| ( 0 , 1 , 2 ) | ( $x_0$ , $y_0$ , $z_0$ , $r_0$ , $g_0$ , $b_0$ ) |
| ( 0 , 1 , 3 ) | ( $x_1$ , $y_1$ , $z_1$ , $r_1$ , $g_1$ , $b_1$ ) |
| ( 1 , 3 , 4 ) | |
| ( 1 , 2 , 4 ) | |
| ( 2 , 4 , 5 ) | |
| ( 2 , 5 , 8 ) | |
| ( 0 , 3 , 6 ) | |
| ( 3 , 6 , 7 ) | |
| ( 3 , 7 , 4 ) | |
| ( 4 , 7 , 5 ) | |
| ( 0 , 2 , 8 ) | |
| ( 0 , 8 , 6 ) | |
| ( 6 , 8 , 9 ) | |
| ( 6 , 9 , 7 ) | |
| ( 7 , 9 , 5 ) | |
| ( 8 , 5 , 9 ) | |

RECONSTRUCTED POLYGONAL MESH DATA

FORMING METHOD FOR STRUCTURING POLYGONAL MESH DATA AND APPARATUS, AND STORAGE MEDIUM

FIELD OF THE INVENTION

The present invention relates to a structured polygonal mesh data forming method and apparatus for approximating a 3D surface shape with a polygonal mesh constituted by a plurality of polygons and forming 2D structured geometry and property data applicable of efficient compression/decompression from the connectivity information of the polygonal mesh, and a storage medium.

BACKGROUND OF THE INVENTION

In general, an object in a 3D space is represented by a set of 3D coordinates of points on the surface of the object and attribute data such as textures on the respective points. In conventional methods of reducing data amount, curvatures at sample points or changes in shape when sample points are deleted are obtained, and the total number of data is decreased by subsampling sample points in flat areas where the curvatures are small or areas where changes in shape are small, thereby reducing the amount of data.

Data used for 3D computer graphics is represented by using a combination of the coordinates of a point in a 3D space and attribute data of the point as a basic element. The image or video sensed by a digital camera or video camera is represented as a set of texture data that do not explicitly contain the position information of each sampling point by determining a scanning order for the data sampled at lattice points set on a square or rectangle imaging plane at equal intervals in the vertical and horizontal directions. Such data is called structured data and is greatly compressed by a standard image/video encoding means such as JPEG or MPEG.

In communication of 3D visual information, however, demands have arisen for improvements in convenience, e.g., developing a system applicable of moving a viewpoint according to user's intention or allowing the user to feel a sense of depth and transmitting the data necessary for the system with sufficient quality within a short time so the user will not feel any stress.

SUMMARY OF THE INVENTION

The present invention has been made to solve the above problems and is characterized by having the following arrangement.

There is provided a structured polygonal mesh data forming method of approximating a 3D surface shape with a polygonal mesh constituted by a plurality of polygons and forming 2D structured geometry and property data applicable of efficient compression/decompression from connectivity information of the polygonal mesh, comprising:

the step of forming a vertex assignment table by assigning vertices constituting the polygonal mesh to nodes as lattice points on a 2D coordinate system to maintain neighboring relations among adjacent polygons on a 2D lattice plane; and the step of forming the 2D structured geometry and property data from the vertex assignment table that indicates correspondences between the respective vertices and the respective nodes on the 2D lattice plane, wherein the step of forming the vertex assignment table performs an assigning processing which allows to assign a vertex of the polygon mesh to a plurality of nodes on the 2D coordinate system. This method will be referred to as the first aspect of the present invention hereinafter.

In the above structured polygonal mesh data forming method, the 2D structured geometry and property data preferably comprises geometry data consisting of position coordinate data of the respective assigned polygon vertices, property data including color and normal vector information of each vertex, and a connectivity map which is information about connection between the respective vertices.

Preferably, the above structured polygonal mesh data forming method further comprises the coding step of coding the 2D structured data.

In the above structured polygonal mesh data forming method, the coding step is preferably the step of encoding the connectivity map, which is obtained from the vertex assignment table, in lossless compression.

In the above structured polygonal mesh data forming method, the polygon preferably consists of connected triangles.

In the above structured polygonal mesh data forming method, the color information is preferably color information for reproducing a color of each vertex.

Preferably, the above structured polygonal mesh data forming method further comprises a structuring step of converting the vertex assignment table into a connectivity map.

In the above structured polygonal mesh data forming method, the structuring step is preferably the step of assigning a polygon vertex to a plurality of nodes, if the plurality of nodes with the same assigned vertex are linked on the 2D coordinate system, selecting one representative node from the nodes with the same vertex, and representing positions of the nodes with the same vertex which are not selected as the representative node by relative positions to the representative node, thereby structuring the connectivity information.

Preferably, the above structured polygonal mesh data forming method further comprises the step of compressing the 2D structured data.

In addition, there is provided a structured polygonal mesh data forming apparatus for approximating a 3D surface shape with a polygonal mesh constituted by a plurality of polygons and forming 2D structured geometry and property data applicable of efficient compression/decompression from connectivity information of the polygonal mesh, comprising:

means for forming a vertex assignment table by assigning vertices of the polygonal mesh to nodes as lattice points on a 2D coordinate system to maintain neighboring relations among adjacent polygons on a 2D lattice plane; and means for forming the 2D structured geometry and property data from the vertex assignment table which indicates correspondences between the polygon vertices and the nodes on the 2D lattice plane, wherein the means for forms the vertex assignment table performs an assigning processing which allows to assign a vertex of the polygon mesh to a plurality of nodes on the 2D coordinate system.

Furthermore, there is provided a computer-readable memory storing program codes for approximating a 3D surface shape with a polygonal mesh constituted by a plurality of polygons and forming 2D structured geometry and property data applicable of efficient compression/decompression from connectivity information concerning the polygonal mesh, the program codes comprising:

a code for executing the step of forming a vertex assignment table by assigning polygon vertices constituting the polygonal mesh to nodes as lattice points on a 2D coordinate system to maintain neighboring relations among adjacent polygons on a 2D lattice plane; and a code for executing the step of forming the 2D structured geometry and property data from the vertex assignment table that indicates correspondences between the respective vertices and the respective nodes on the 2D lattice plane, wherein the code for executing the step of forming the vertex assignment table is a code for executing an assigning processing which allows to assign a vertex of the polygon mesh to a plurality of nodes on the 2D coordinate system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A to 4D are views each showing an example of a 3D shape with larger numbers of vertices and connections, in which FIG. 4A shows wire frame display, FIG. 4B shows polygonal display, FIG. 4C shows wire frame display, and FIG. 4D shows polygonal display;

FIGS. 12A to 12E are views showing the relationship between processes in case 1 and the polygon vertices according to the first embodiment;

FIGS. 15A to 15G are views showing the relationship between processes in case 2 and the polygon vertices according to the first embodiment;

FIGS. 16A and 16B are views each showing an example of the arrangement of polygons in case 3 according to the first embodiment;

FIGS. 19A and 19B are views each showing the positional relationship between the central node and six adjacent nodes according to the first embodiment;

FIGS. 20A to 20C are views for explaining the flow of representative node determination according to the first embodiment;

FIGS. 23A and 23B are views showing a connectivity map and separate area information according to the first embodiment;

FIGS. 24A and 24B are view schematically showing structured geometric data and texture data according to the first embodiment;

FIG. 27A is a view showing a decoded connectivity map and separate area information, and FIG. 27B is a view showing a vertex assignment table in which predetermined vertex numbers are assigned to representative nodes in the raster scanning order;

FIGS. 28A and 28B are views schematically showing reconstructed geometric data and texture data; and FIG. 29 is a view showing an example of reconstructed polygonal mesh data according to the first embodiment.

DETAILED DESCRIPTION OF THE PREFERRED EMBODIMENT

Figure 1A:
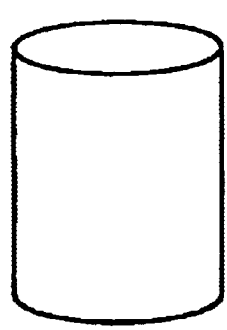
FIGS. 1A to 1C are perspective views showing polygonal models representing cylinders by polygons.

To transmit visual information at high speed, it is important to compress image and video data. Presently, structured data sampled at equal intervals in the horizontal and vertical directions and time-axis direction are efficiently compressed by using transform coding or motion-compensated prediction. Data representation forms that can provide images and videos in accordance with user's intention have been developed in the field of computer graphics. An object is represented by 3D shape data of the object, texture data for providing reflection characteristics of light on the surface, and the like. In this representation form, the viewpoint direction and position can be freely changed by designating an incident state of external light.

As a most versatile representation method for surface shapes, textures, and the like, a method of decomposing a surface into a set of triangles and using the geometric data of polygon vertices, the connectivity information of vertices forming polygons, the texture values of the respective vertices, and the like is known. This method is called polygonal mesh representation, in which the adjacency state between vertices forming one polygon is explicitly represented, but the adjacency relationship with the vertices of other polygons is not explicitly represented.

For a polygonal mesh coding method, Deer et al. uses generalized triangular stripes. According to the topological analysis method proposed by Taubin et al, the connectivity of triangles is efficiently represented by using a set of triangular stripes. However, for compression of geometric and texture data which occupies most of CG data, simple scalar quantization or linear predictive coding based on vertex spanning tree or triangle spanning tree is conceivable.

In the present invention, to efficiently represent geometric and texture data (i.e., geometry and property data) and the like, all the polygons forming a polygonal mesh are decomposed into triangles first, and then the triangles are assigned to a triangular lattice including nodes for extending the respective triangles, thereby structuring geometric and texture data and the like as a data array on a 2D plane.

The structured geometric and texture data and the like are efficiently converted into a bit sequence by using 2D data compression. In this case, the connectivity of the respective vertices is represented by a connectivity map indicating the global connection relationship between the vertices, and the data is compressed by using an adaptive arithmetic coder without loss. The compressed data is then recorded and transmitted. In the reconstruction mode, first of all, the connectivity map is decoded, and the geometric and texture data and the like are decoded on the basis of the decoded map. By extracting triangles as sets of adjacent lattice points including no extension nodes of the connectivity map, the connectivity information of the respective triangles representing a polygonal mesh, geometric data, texture data, and the like can be reconstructed.

This method makes it possible to achieve great data compression of polygonal mesh data which realize rendering that reflects user's intention. Detailed contents of this processing will be described below.

1. Polygonal Mesh Representation

When the surface of an object is approximated with planes defined by vertices, each plane is referred to as a polygon. A 3D modeling method of forming a surface by using many flat polygons is called polygonal modeling.

Figure 1B:
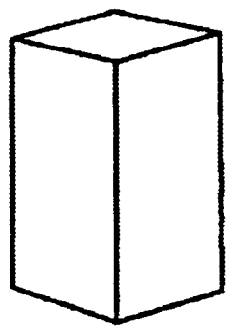
Figure 1C:
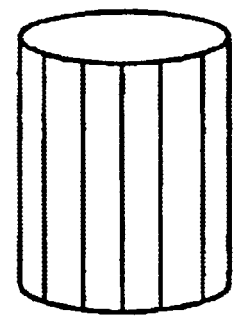

FIGS. 1A to 1C show an example of a polygonal model representing a cylinder by polygons. A method of representing a curved surface by polygons will be referred to as polygonal approximation. A curved surface can be approximated more accurately by using many small polygons.

To represent a shape by polygonal modeling, the following two pieces of information are required.

① Geometric Data

This data is used to represent a shape by sets $(x_1, Y_1, Z_1)$, $(X_2, y_2, Z_2)$, $(X_3, y_3, Z_3)$, ... of the coordinates of vertices.

② Connectivity Information

This information is used to represent a shape by sets (1, 2, 3), (2, 3, 4), (4, 5, 6), ... of vertices forming triangles.

Figure 2:
FIG. 2 is a view showing an example of data used to form polygons.
Figure 3B:
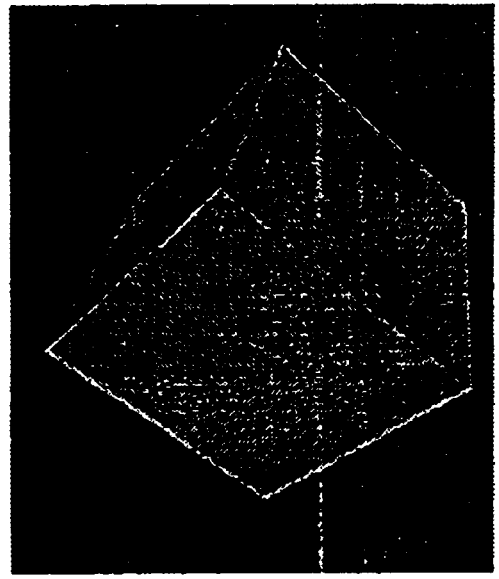
FIG. 3B is a view showing polygonal display of a 3D shape formed from the data in FIG. 2.
Figure 3A:
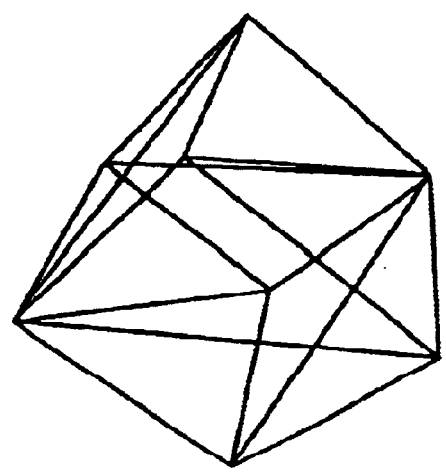
FIG. 3A is a view showing wire frame display of a 3D shape formed from the data in FIG. 2.
Figure 4A:
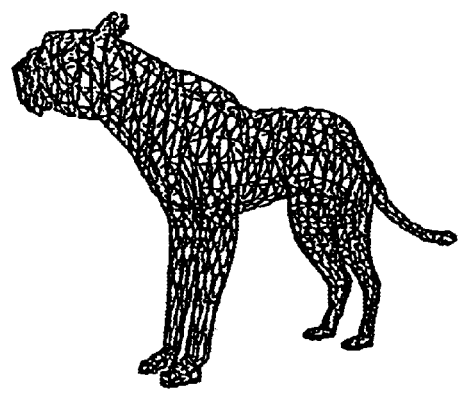
Figure 4B:
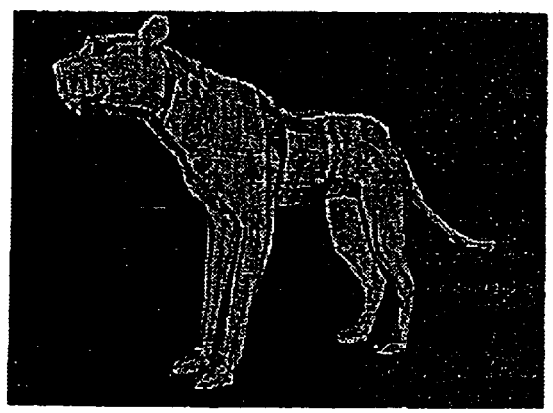
Figure 4C:
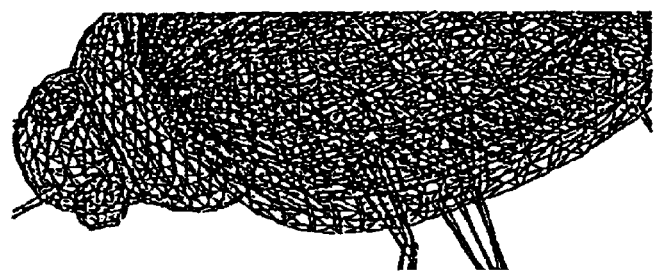
Figure 4D:

FIGS. 3A and 3B show examples of actual 3D rendering from these two pieces of information when the respective data are defined as shown in FIG. 2. In this case, FIG. 3A shows an example of rendering based on wire frame model. FIG. 3B shows an example of rendering based on polygonal model.

FIGS. 4A to 4D show examples of 3D shapes having larger numbers of vertices and connections.

2. Polygonal Mesh Structurization 2.1 Overall Flow

When a 3D surface shape is to be represented by using triangular polygons, two data, i.e., ① geometric data and ② connectivity information, are required, as described in <1. Polygonal Mesh Representation>.

Figure 5:
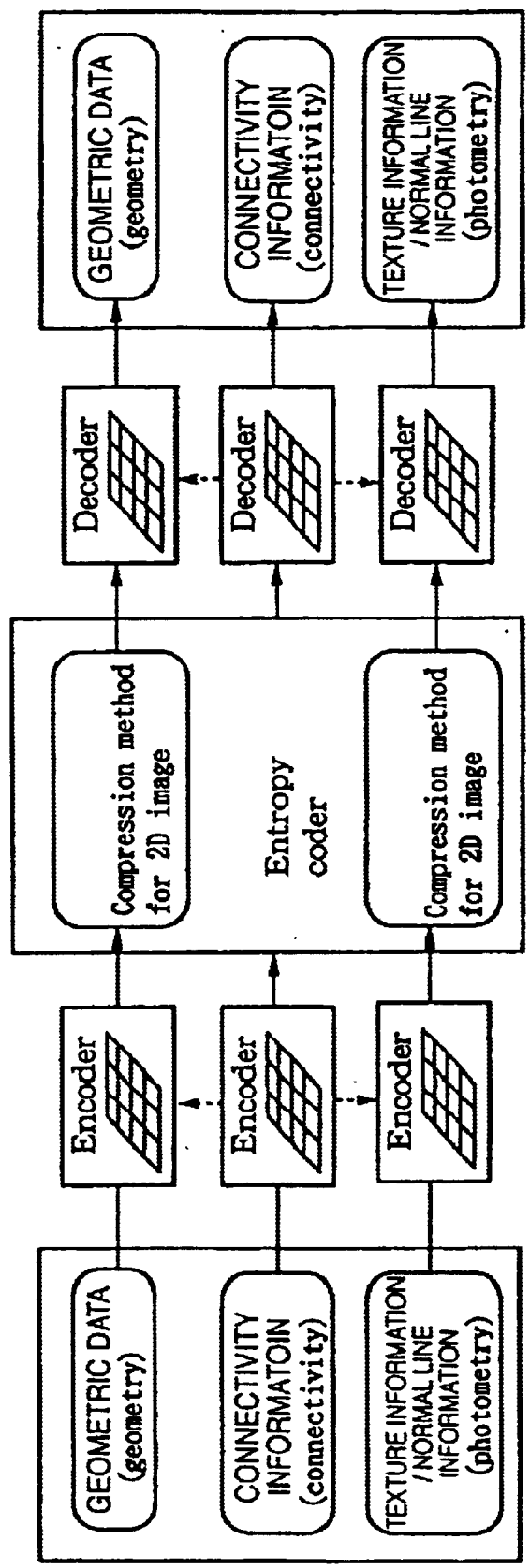
FIG. 5 is a block diagram for explaining coding and decoding when a polygonal mesh data is compressed.

Of these data, the connectivity information provides the configuration of polygon vertices. When, therefore, the information is to be compressed, the connectivity information is encoded in lossless compression so that the neighboring information of the vertices is maintained. In the overall flow of processing in FIG. 5, geometric data and the like are reconstructed by using the reversibly coded connectivity information.

2.2 Structurization by Triangular Lattice

By assigning the respective triangles provided for a connection list to a triangular lattice including extension nodes, the geometric data (3D coordinate values) corresponding to the respective vertices, the values of x, y, and z, texture data, and the like are arranged on 2D coordinates while the relationship between the respective vertices is held. With this, a compression technique used for 2D signals can be used for geometric data, texture data, and the like.

Figure 6:
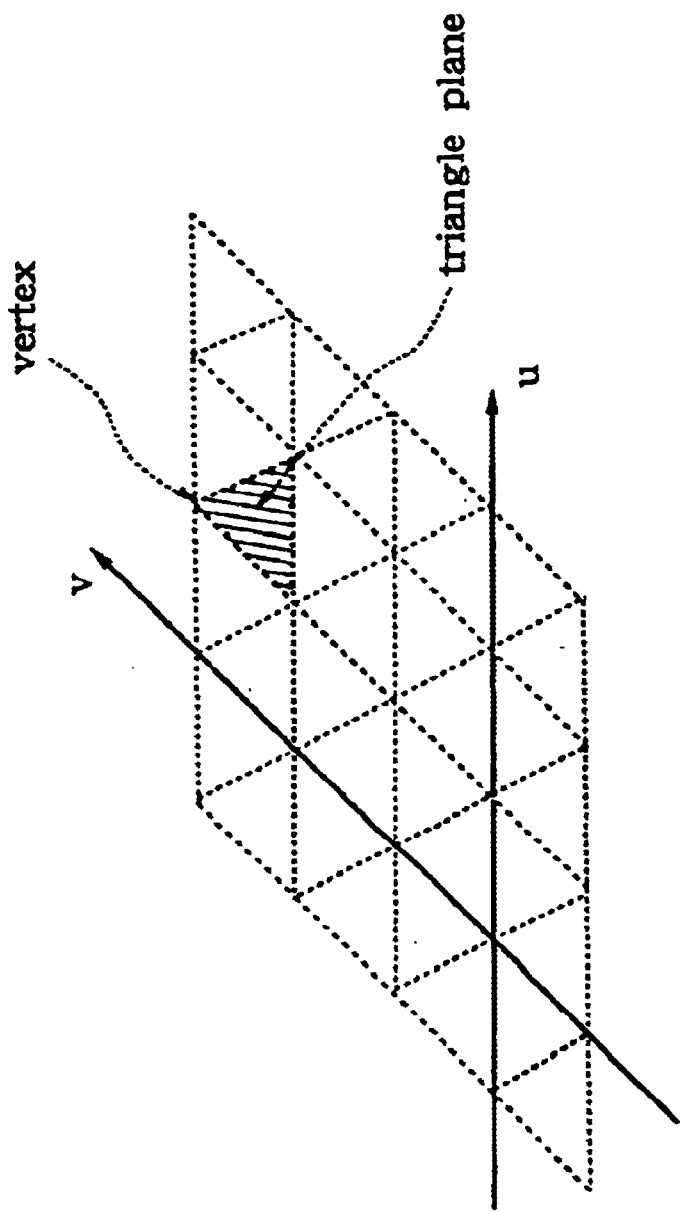
FIG. 6 is a view showing a 2D coordinate system on which a polygonal mesh is developed and projected.

FIG. 6 shows 2D coordinates (u, v) for representing global connectivity information. Vertices are assigned to the respective nodes, and each node is defined to be connected to adjacent six points of the triangular lattice.

The following constraint conditions are required for a 3D shape formed by a polygonal mesh used for this structurization.

Constraint Conditions

① All triangles should be connected with edges.

② Two triangles should be connected to one edge at most.

The first condition indicates that all triangular polygons forming a 3D shape are connected to each other with edges. The second condition indicates that at one edge a plane that includes the edge does not branch.

2.3 Extraction of Initial Rectangle

Figure 7A:
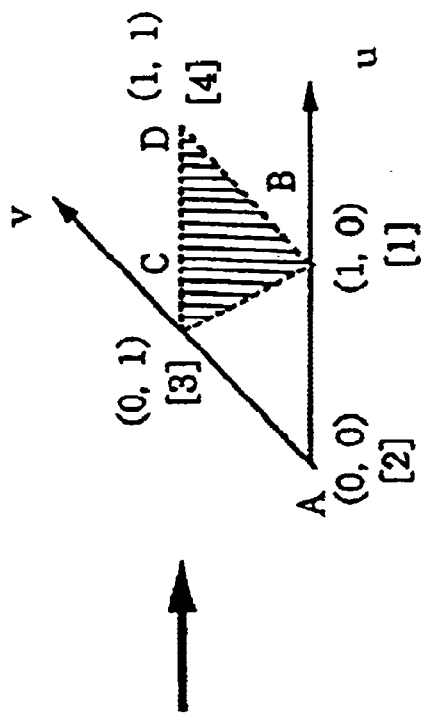
FIGS. 7A and 7B are views for explaining initial rectangle extraction according to the first embodiment of the present invention.
Figure 7B:
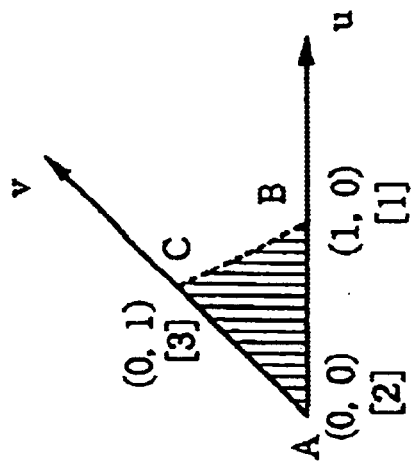

An initial rectangle is extracted to assign the triangles forming a 3D object to the nodes of 2D coordinates (u, v). FIGS. 7A and 7B are views for explaining the extraction of an initial rectangle. First of all, an arbitrary triangle is selected, and two edges are assigned to the u- and v-axis directions (FIG. 7A) Nodes assigned to the respective vertices are represented by A, B, and C, and their positions are expressed as a=(0, 0), b=(1, 0), and c=(0, 1). Vertex numbers $n_A$, $n_B$, and $n_C$ of a triangle ABC are assigned to a vertex assignment table t(p) to express this relationship (p=(u, v)).

t(a)=$n_A$ t(b)=$n_B$ t(c)=$c_C$

A triangle BCD connected to an edge BC and its vertex D is assigned to d=(1, 1) to form a rectangle on the uv coordinate system.

t(d)=$n_D$

FIG. 7B shows a case where an initial rectangle is actually extracted from the connectivity information of the 3D surface shape shown in FIGS. 3A and 3B.

The triangle used for assigning is omitted from the connectivity information list. The same applies to the following processing.

2.4 Assigning Along Four Edges

Triangles connected to the upper, lower, left, and right edges of an initial rectangle are sequentially assigned to nodes in the uv coordinate system. In this case, one vertex can be assigned to a plurality of nodes. Such node will be referred to as extension nodes.

The relationship between vertices and nodes is expressed by assigning vertex numbers to a vertex assignment table t (p). The following values are assigned:

N when there is no vertex that can be assigned to a node, or

φ in a non-processed area in the uv coordinate system.

Figure 8:
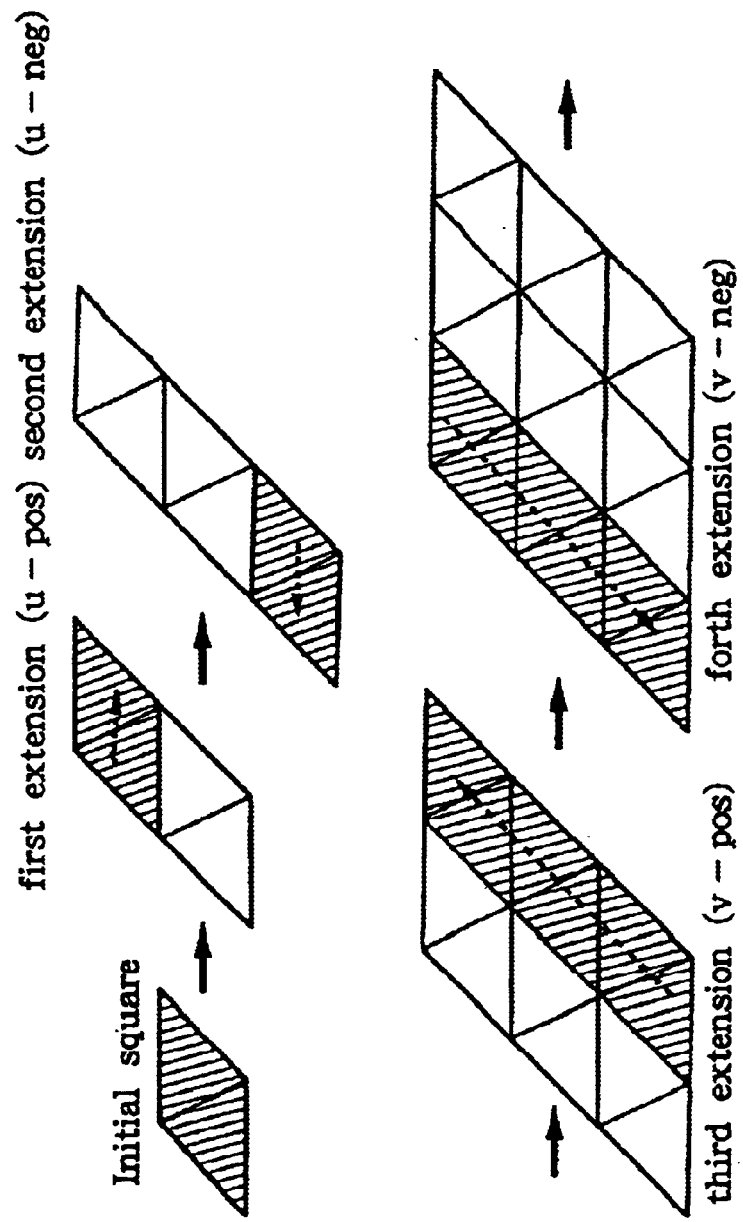
FIG. 8 is a view for explaining assigning between triangles connected to the upper, lower, left, and right edges of an initial rectangle and nodes in the uv coordinate system.

Assigning processing along the upper surface of a rectangle will be described below. However, the same applies to the lower surface, right side surface, and left side surface. Therefore, assigned nodes gradually extend in the upward, downward, leftward, and rightward directions. FIG. 8 shows an example of this processing.

Assume that when processing in one direction is complete, all portions that are newly extended are N, i.e., no triangle is assigned. In this case, it should be noted that these portions are not assigned to a vertex assignment table. In the final stage of the processing, therefore, extension may not be made in the sequence shown in FIG. 8.

2.5 Assigning Processing to Upper Surface

Figure 9:
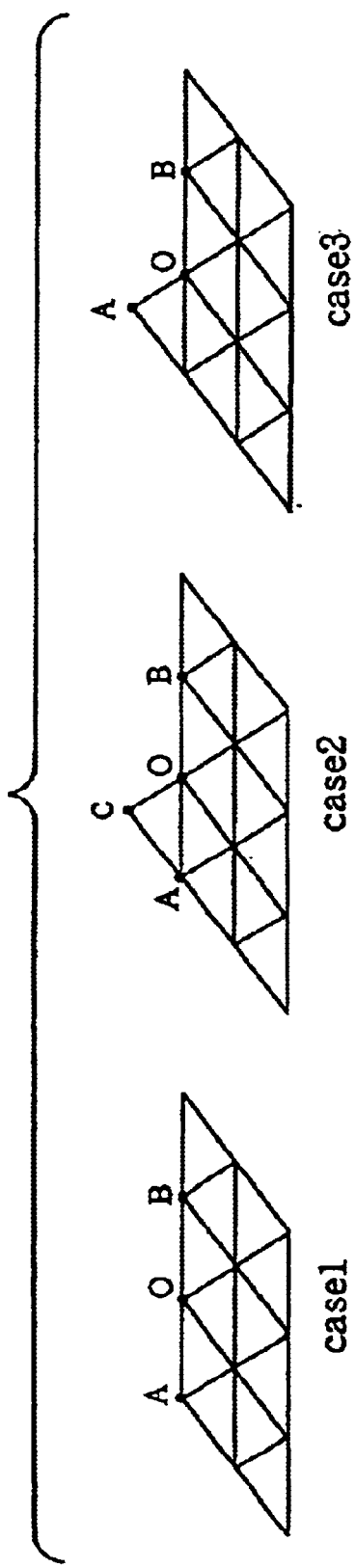
FIG. 9 is a view showing how processed states on a uv plane are classified into three states according to the first embodiment.

Assigning processing on the upper surface of a rectangular area processed on the uv plane will be described. In assigning processing on the upper surface, the processed state on the uv plane is roughly classified into three cases as shown in FIG. 9, each case is further branched, and vertices connected to the respective edges are assigned.

Branching of each case will be described in detail next. The rough flow of branching of each case will be described first with reference to the accompanying drawings, and then will be described in detail later.

Figure 10A:
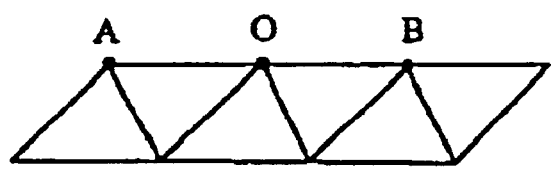
FIGS. 10A and 10B are views each showing an example of the arrangement of polygons in case 1 according to the first embodiment.
Figure 10B:
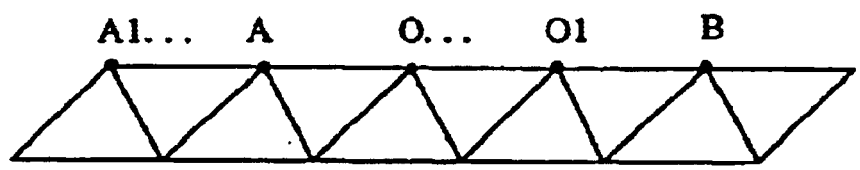
Figure 11:
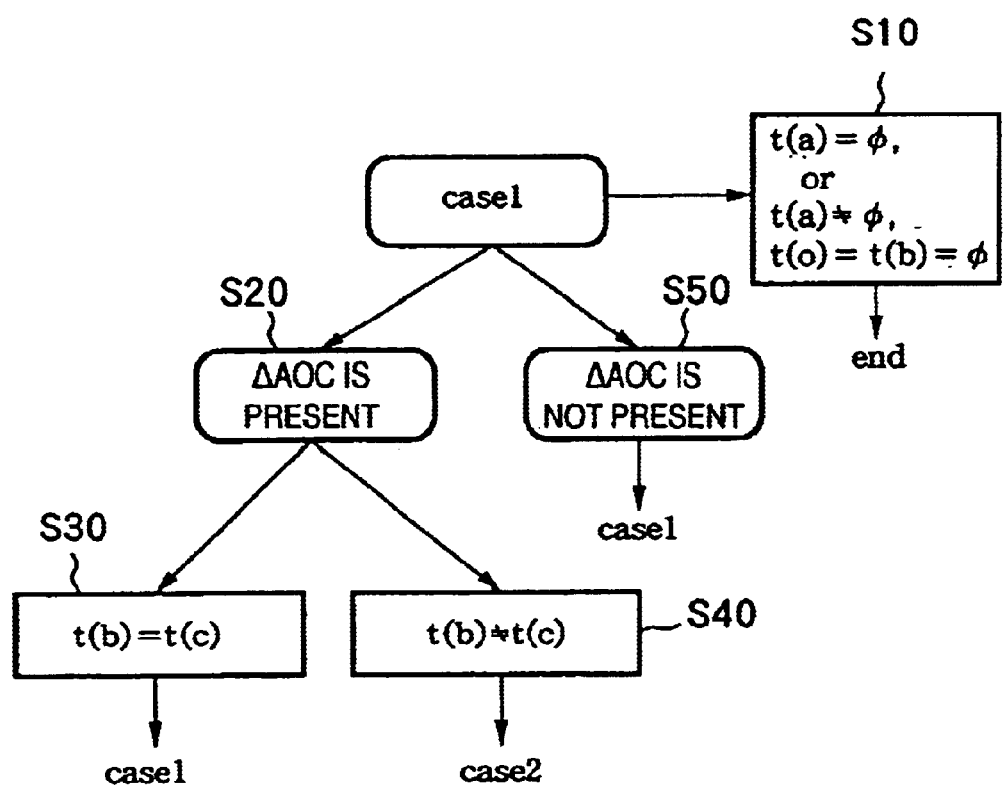
FIG. 11 is a flow chart showing each case branched from case 1 and/or processing in each case according to the first embodiment.

2.5.1 Case 1 (FIGS. 10A and 10B)

Case 1 includes three points A, O, and B of interest, and the three points are arranged on a straight line on a 2D coordinate system (FIG. 10A). Nodes having the same vertex numbers as those of the points A and O are represented as A1 and O1 to inhibit the points A, O, and B from having the same vertex number (see FIG. 10B).

Each case branched from case 1 and/or processing in each branched case will be described below.

Step S10 is the step of determining an end condition for upper surface processing.

If the condition of $t(a)=\phi(t(b)=\phi, t(c)=\phi)$ is satisfied, processing up to the right end of the uv coordinate system ends. The flow of processing then advances to the next axis.

In addition, if $t(a)\neq\phi$ and $t(o)=t(b)=\phi$, N is assigned above A (FIG. 12A).

Note that iu and iv are the unit directional vectors of the u and v axes. The flow of processing then advances to the next axis.

If there is a triangle AOC including an edge AO (FIG. 12B), it is checked in step S20 whether the vertex number of B is identical to that of C. If the vertex number of B is identical to that of C, the vertex number of A is assigned to the upper right side of A and the vertex number of B is assigned to the upper left side of B in step S30 (FIG. 12C).

$t(a+iv)=t(a)$ $t(a+iv-iu)=t(b)$

Referring to FIG. 10B, the vertex numbers of N and B are respectively assigned to the upper right side of A1 and the upper right side of O1.

$t(a1+iv)=N$ $t(o1+iv)=t(b)$

After the assignment, the upper left of the old point B is set as the new point A, and the points O and B are set on the right side of the new point A. The flow then advances to case 1.

Figure 12D:
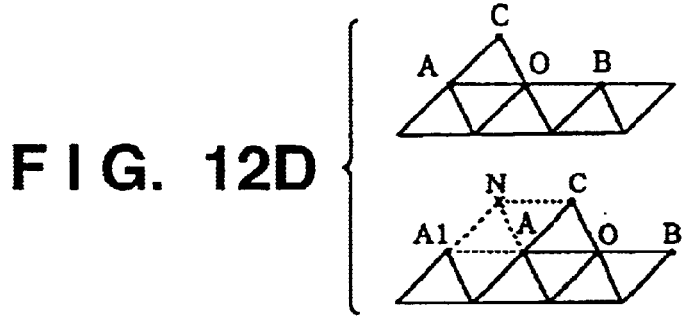

If it is determined in step S20 that the vertex number of B differs from that of C (FIG. 12D). In step S40, the vertex number of C is assigned to the upper right side of A.

$t(a+iv)=n_C$

The same applies to the case shown in FIG. 10B. After the assignment, the flow of processing advances to case 2.

If a triangle AOC including the edge AO does not exist, N is assigned to the upper right side of A in step S50 (FIG. 12E).

$t(a+iv)=N$

In the case shown in FIG. 10B as well, N is assigned to the upper right side of every A1. After the assignment, the new points A, O, and B are set on the right side of the old point O, and the flow of processing advances to case 1.

2.5.2 Case 2

Figure 13A:
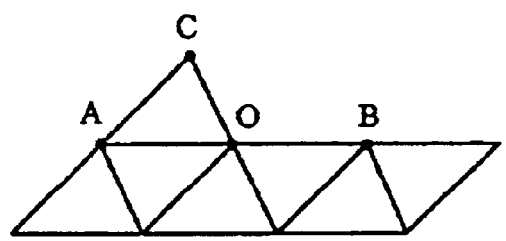
FIGS. 13A to 13C are views each showing an example of the arrangement of polygons in case 2 according to the first embodiment.
Figure 13B:
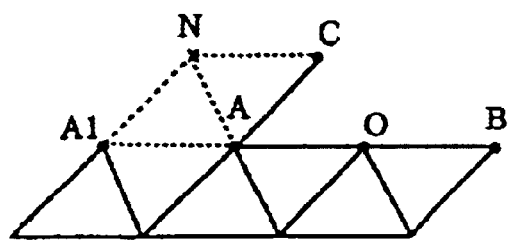
Figure 13C:
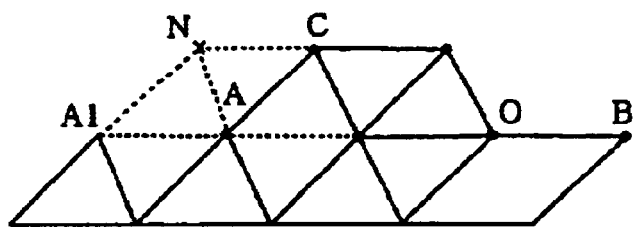
Figure 14:
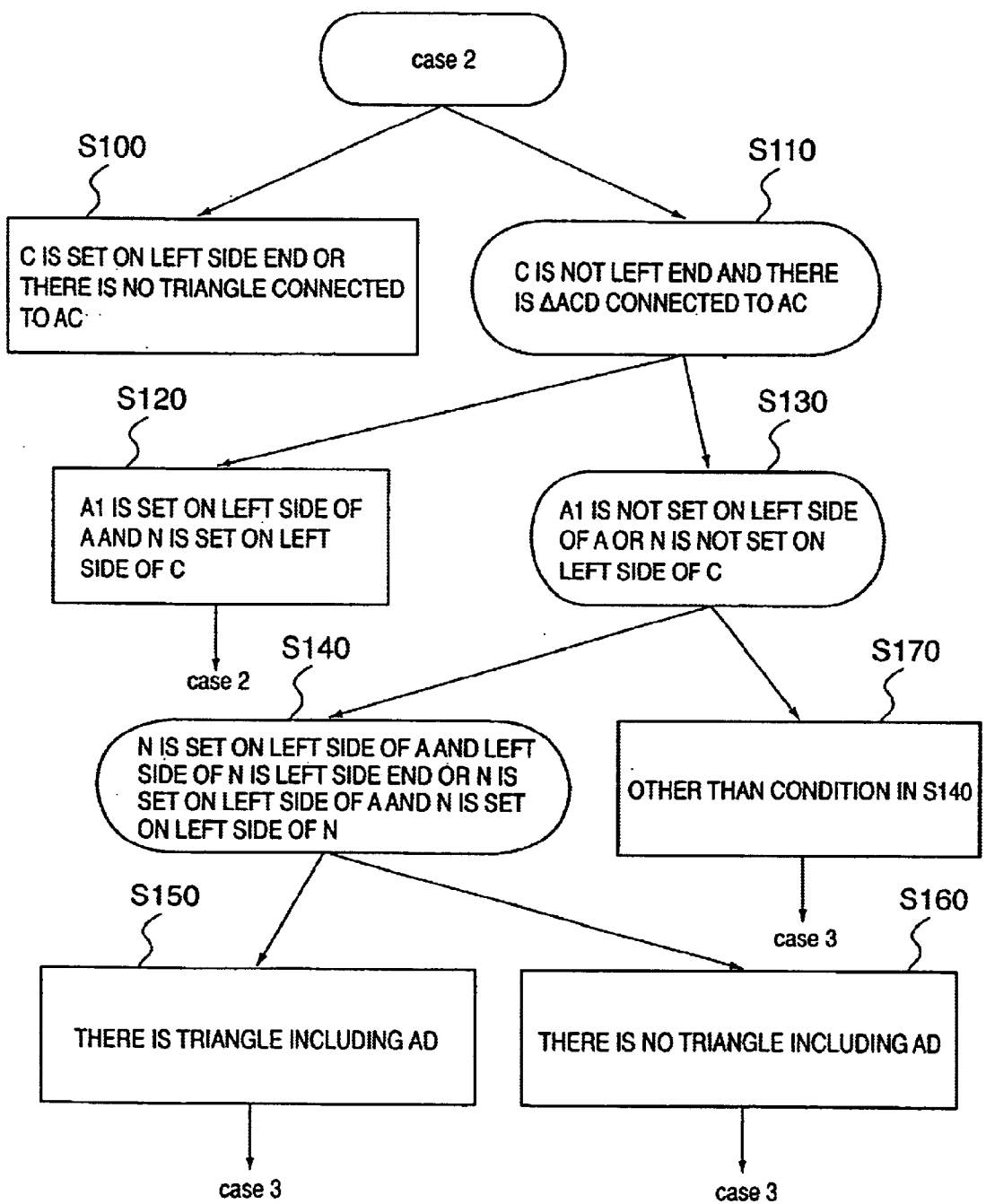
FIG. 14 is a flow chart showing each case branched from case 2 and/or processing in each case according to the first embodiment.

Case 2 includes four points A, O, B, and C as nodes of interest, and the node C is set on the upper right side of A (FIG. 9). FIG. 13A shows a basic state. FIG. 13B shows a state where a plurality of nodes A are arranged. If the flow of processing returns from the state in FIG. 13B to case 2 immediately after processing, the state shown in FIG. 13C is set. FIG. 14 shows cases branched from case 2 and/or processing in each case. This processing will be described below with reference to FIG. 14.

If C is set on the left side end or no triangle is connected to the edge AC (FIG. 15A), A is set on the upper left side of O in step S100, and the flow advances to case 3.

If C is not set on the left side end and there is a triangle connected to the edge AC (FIG. 15B), it is checked in step S110 whether A1 is set on the left side of A and N is set on the left side of C. If A1 is on the left of A and N is on the left of C, the vertex number of D connected to AC is assigned to the upper left side of A, i.e., the left side of C (step S120).

$t(a-iu+iv)=n_D$

After the assignment, the old node D is set as the new node C, and the new node A is set on the left side of the old node A, i.e., below the old node D, and the flow advances to case 2 (FIG. 15C).

If A1 is not set on the left side of A or N is not set on the left side of C, it is checked in step S130 whether N is set on the left side of A and the left of N is the left end, or N is set on the left side of A and N is also set on the left side of N (in this case, N is always set above N). If N is set on the left side of A and the left of N is the left end, or N is set on the left side of A and N is also set on the left side of N (FIG. 15D), it is checked in step S140 whether there is a triangle including AD.

If there is a triangle including AD, the vertex number of A is assigned to the upper left side of A, i.e., the left side of C, in step S150.

$t(a-iu+iv)=t(a)$

After the assignment, the old node C is set as the new node A (on the upper left of the old node O), and the flow advances to case 3 (FIG. 15E).

If there is no triangle including AD, the vertex number of D is assigned to the upper left side of A, i.e., the left side of C, in step S160.

$$t(a-iu+iv)=n_D$$

After the assignment, the new node A is set on the upper left side of the old node O, and the flow advances to case 3 (FIG. 15F).

If the condition does not correspond to step S140, the vertex number of A is assigned to the position of C, i.e., the upper right side of A in step S170. At this time, the triangle formed by the nodes A and C and the right of A is restored in the connection list. After the assignment, the new node A is set on the upper left side of the old node O, and the flow advances to case 3 (FIG. 15G).

2.5.3 Case 3

Figure 17:
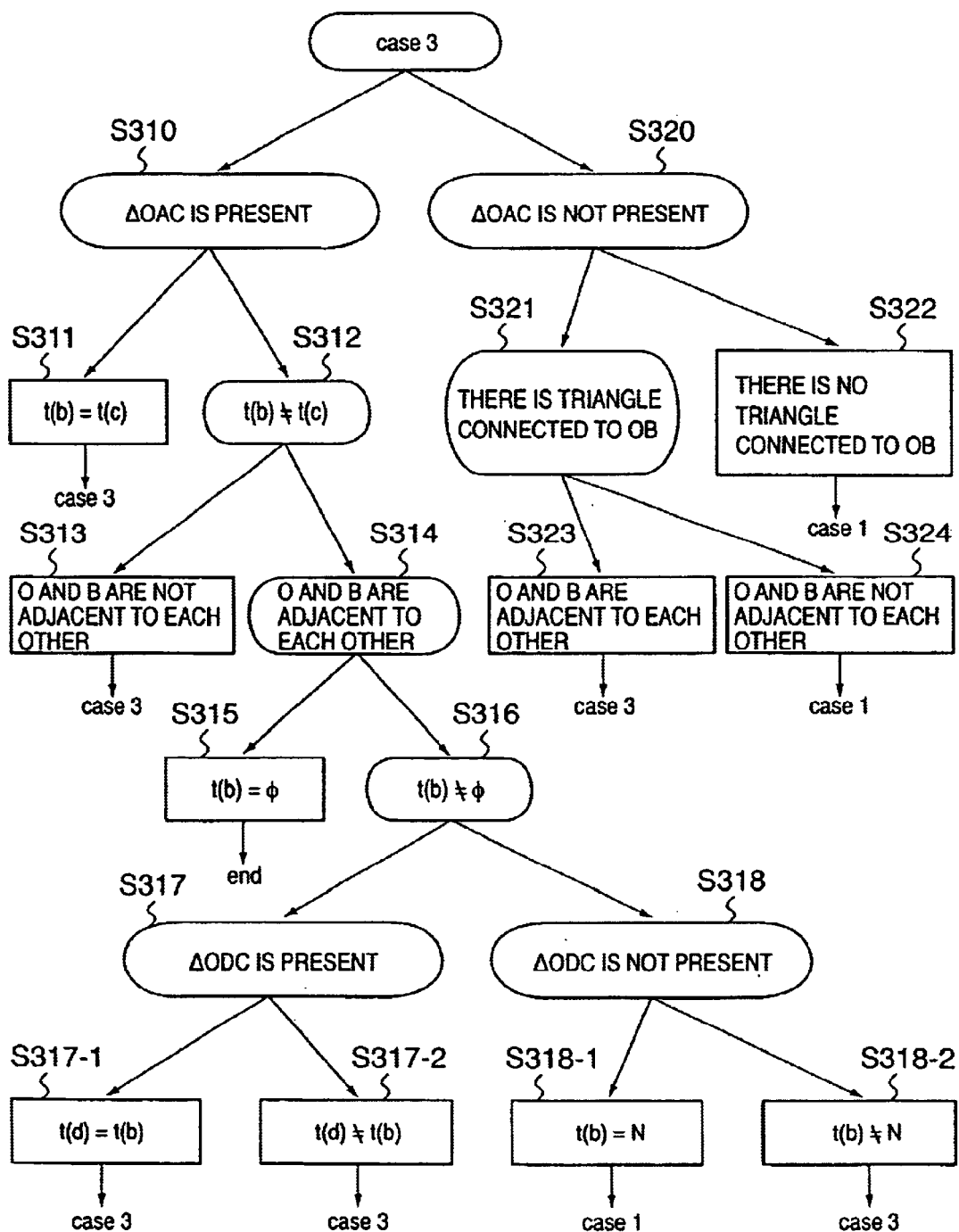
FIG. 17 is a flow chart showing each case branched from case 3 and/or processing in each case according to the first embodiment.

Case 3 includes three points A, O, and B as nodes of interest, with the node A set on the upper level, and the nodes O and B set on the lower level (see FIG. 9). FIG. 16A shows a basic arrangement. When a plurality of nodes O are set side by side, the arrangement shown in FIG. 16B is obtained. The processing may branch to different nodes between FIGS. 16A and 16B. FIG. 17 shows each case branched from case 3 and/or processing in each case.

Figure 18A:
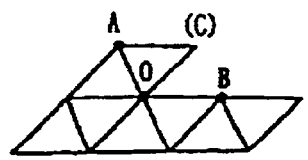
FIGS. 18A to 18L are views showing the relationship between processes in case 3 and the polygon vertices according to the first embodiment.

If a triangle OAC connected to an edge OA exists (FIG. 18A), it is checked in step S310 whether the vertex number of B is identical to that of C. If the vertex number of B is identical to that of C, the vertex number of B is assigned to the upper right side of O in step S311.

$$t(o+iv)=t(b)$$

In the case shown in FIG. 16B, the vertex number of B is assigned to the upper right side of an extension node O1.

$$t(o1+iv)=t(b)$$

Figure 18B:
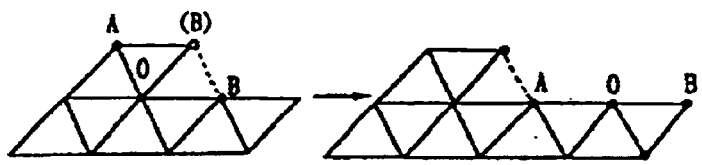

After the assignment, the new nodes A, O, and B are arranged on the right side of the old node B, and the flow advances to case 1 (FIG. 18B).

Figure 18C:
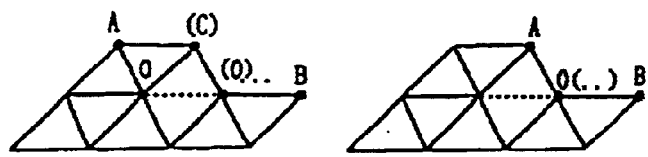

If it is determined in step S310 that the vertex number of B differs from that of C, it is checked in step S312 whether O and B are adjacent to each other. If it is determined that O and B are not adjacent to each other, the vertex number of C is assigned to the upper right side of O in step S313. After the assignment, the new node A is set on the upper right side of the old node O, i.e., the right side of the old node A, and the new node O is set on the right side of the old node O. The flow then advances to case 3 (FIG. 18C).

Figure 18D:
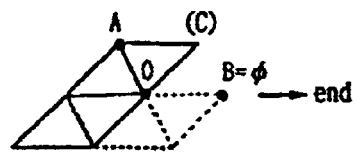

If it is determined in step S312 that O and B are adjacent to each other, it is checked in step S314 whether B is φ. If it is determined that B is φ, the vertex number of C is assigned to the upper right side of O, i.e., the right side of A in step S315, and the processing ends (FIG. 18D).

Figure 18E:
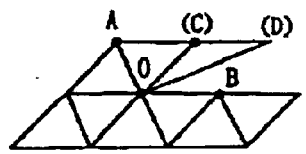
Figure 18F:

If it is determined in step S314 that the value of B is not φ, it is checked in step S316 whether there is a triangle including OC. If it is determined that there is a triangle ΔOCD including OC (FIG. 18E), it is checked in step S317 whether the vertex number of D is identical to that of B (FIG. 18F). In step S317-1, the vertex number of C is assigned to the upper right side of O. After the assignment, the new node A is set on the upper right side of the old node O, i.e., the right side of the old node A, the old node B is set as the new node O, and a node which is located on the right side of the old node B and differs from the old node B is set as the new node B. The flow then advances to case 3.

Figure 18G:
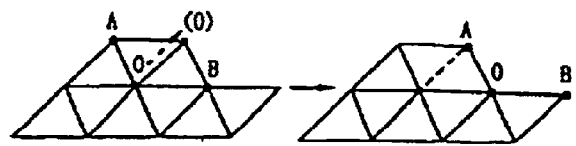

If the vertex number of D is not identical to that of B (FIG. 18G), the vertex number of O is assigned to the upper right side of O in step S317-2. After the assignment, the new node A is set on the upper right side of the old node O, i.e., the right side of the old node A, the old node B is set as the new node O, and a node which is located on the right side of the old B and differs from the old node B is set as the new node B. The flow then advances case 3.

Figure 18H:
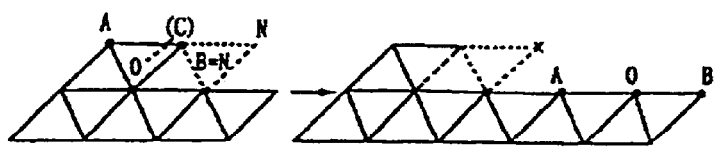

If it is determined in step S316 that there is no triangle including OC (FIG. 18H), it is checked in step S318 whether t(b)=N. If t(b)=N, the vertex number of C is assigned to the upper right side of O, and N is assigned to the upper right side of B in step S318-1. After the assignment, the new nodes A, O, and B are arranged on the right side of the old node B. The flow then advances to case 1.

Figure 18I:
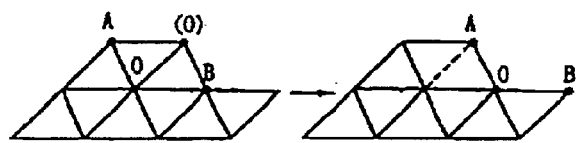

If t(b)≠N (FIG. 18I), the vertex number of O is assigned to the upper right side of O in step S318-2. After the assignment, the new node A is set on the upper right side of the old node O, i.e., the right side of the old node A, the old node B is set as the new node O, and a node which is located on the right side of the old node B and differs from the old node B is set as the new node B. The flow then advances to case 3.

Figure 18J:
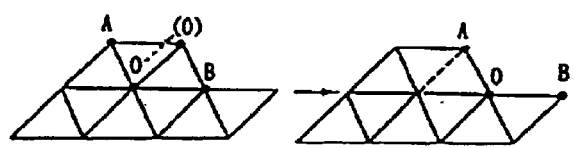

If the triangle OAC including the edge OA does not exist in the initial state of case 3, it is checked in step S320 whether there is a triangle connected to OB. If it is determined that there is a triangle connected to OB, it is checked in step S321 whether O and B are adjacent to each other. If O and B are adjacent to each other (FIG. 18J), the vertex number of O is assigned to the upper right side of O in step S323. After the assignment, the new node A is set on the upper right side of the old O, i.e., the right side of the old node A, the old node B is set as the new node O, and a node which is located on the right side of the old node B and differs from the old node B is set as the new node B. The flow then advances to case 3.

Figure 18K:
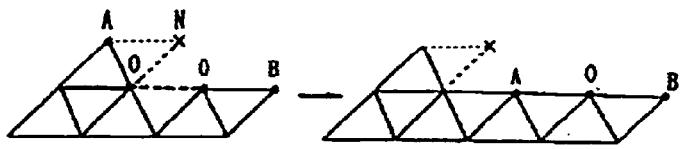

If O is not adjacent to B (FIG. 18K), N is assigned to the upper right side of O in step S324. After the assignment, the new nodes A, O, and B are arranged on the right side of the old node O. The flow then advances to case 1.

Figure 18L:

If it is determined in step S320 that there is no triangle connected to OB (FIG. 18L), N is assigned to the upper right side of O, i.e., the right side of A in step S322. After the assignment, the new nodes A, O, and B are arranged on the right side of the old node B. The flow then advances to case 1.

3. Structurization of Geometric Data and Texture Data

A method of structuring the geometric data and texture data of vertices by using the above vertex assignment table will be described below. The structured data can be efficiently represented by using a 2D image compression technique or the like.

3.1 Determination of Representative Nodes

The vertex assignment table includes extension nodes to which one vertex is assigned. One node is selected as a representative node from the extension nodes to which the same vertex number is assigned. The position of representative node is set as the vertex position on the uv coordinate system to structure geometric data and texture data. Since structured data is compressed by using a 2D image compression technique, a given representative node is required to be adjacent to other representative nodes. For this reason, a representative node is determined such that the representative node is connected to adjacent representative nodes in six directions on a triangular lattice (FIGS. 19A and 19B).

A representative node is determined in the following three stages.

First Search

Of nodes having target vertex numbers, a node having a largest number of other vertex numbers in six adjacent nodes is set as a representative node. If such nodes exist in large number, the determination is regarded as pending, and the flow advances to the next step.

Second Search

Of nodes having pending vertex numbers, a node having a largest number of representative nodes at six adjacent positions is set as a representative node. If a plurality of such nodes exist, one node is selected randomly. FIGS. 20A to 20C show an example of how a representative node is determined.

3.2 Simplification of Extension Nodes

The vertex numbers of nodes which are not selected as a representative node are simplified in the following two cases:

(1) nodes inside an area connected to a representative node; and (2) nodes outside an area connected to a representative node.

Figure 21:
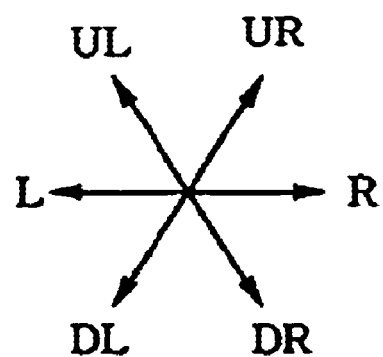
FIG. 21 is a view showing symbols used to simplify the vertex numbers of nodes that are not selected as representative nodes.

The node in an area connected to a representative node are represented by using the following six symbols (FIG. 21):

L (Left link) . . . vertex number is identical to that of left node;

UL (Upward Left) . . . vertex number is identical to that of upper left node;

DL (Downward Left) . . . vertex number is identical to lower left node;

R (Right link) . . . vertex number is identical to right node;

UR (Upward Right) . . . vertex number is identical to upper right node; and

DR (Downward Right) . . . vertex number is identical to that of lower right node.

Of nodes outside an area connected to a representative node, one node connected to another representative node is selected from an area in which nodes having the same vertex number are connected. A symbol S (Split node) is assigned to this node, and the position of a representative node having the same vertex number as that of this node is recorded.

If a polygonal mesh to be coded is a closed curved surface, all the position coordinates of representative nodes with respect to the node assigned the symbol S need not be recorded.

Figure 22:
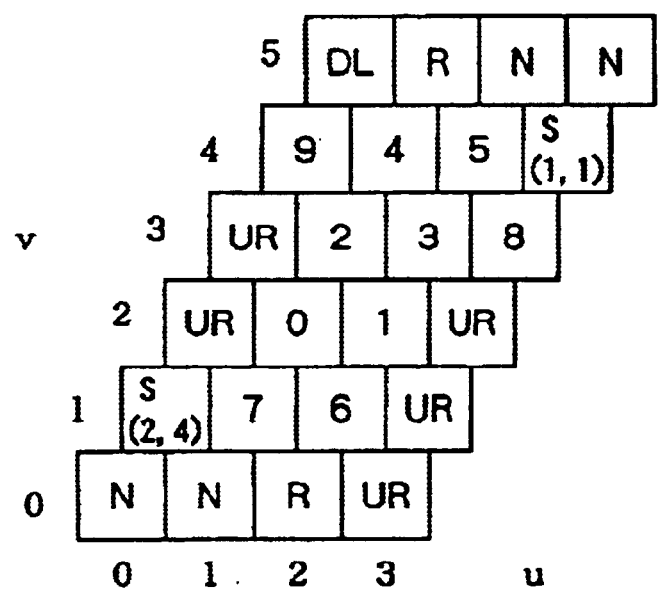
FIG. 22 is a view showing an example of how the arrangement shown in FIG. 20C is simplified by using the above symbols.

FIG. 22 shows an example of how the arrangement shown in FIG. 20C is simplified by using the above symbols.

In the case shown in FIG. 22, a closed curved surface is represented. If one of representative node positions corresponding to the two nodes assigned to the symbol S is recorded, the other representative node can be known from a condition that a boundary node is closed.

3.3 Structurization of Data

Geometric data and texture data are arranged at representative node positions in a simplified vertex assignment table to form structured data. A symbol C (Corresponded node) is assigned to each representative node. The resultant data is called a connectivity map. FIGS. 23A and 23B show a connectivity map. FIGS. 24A and 24B show structured data of geometric data and texture data, respectively.

4. Coding of Structure Data

Figure 25:
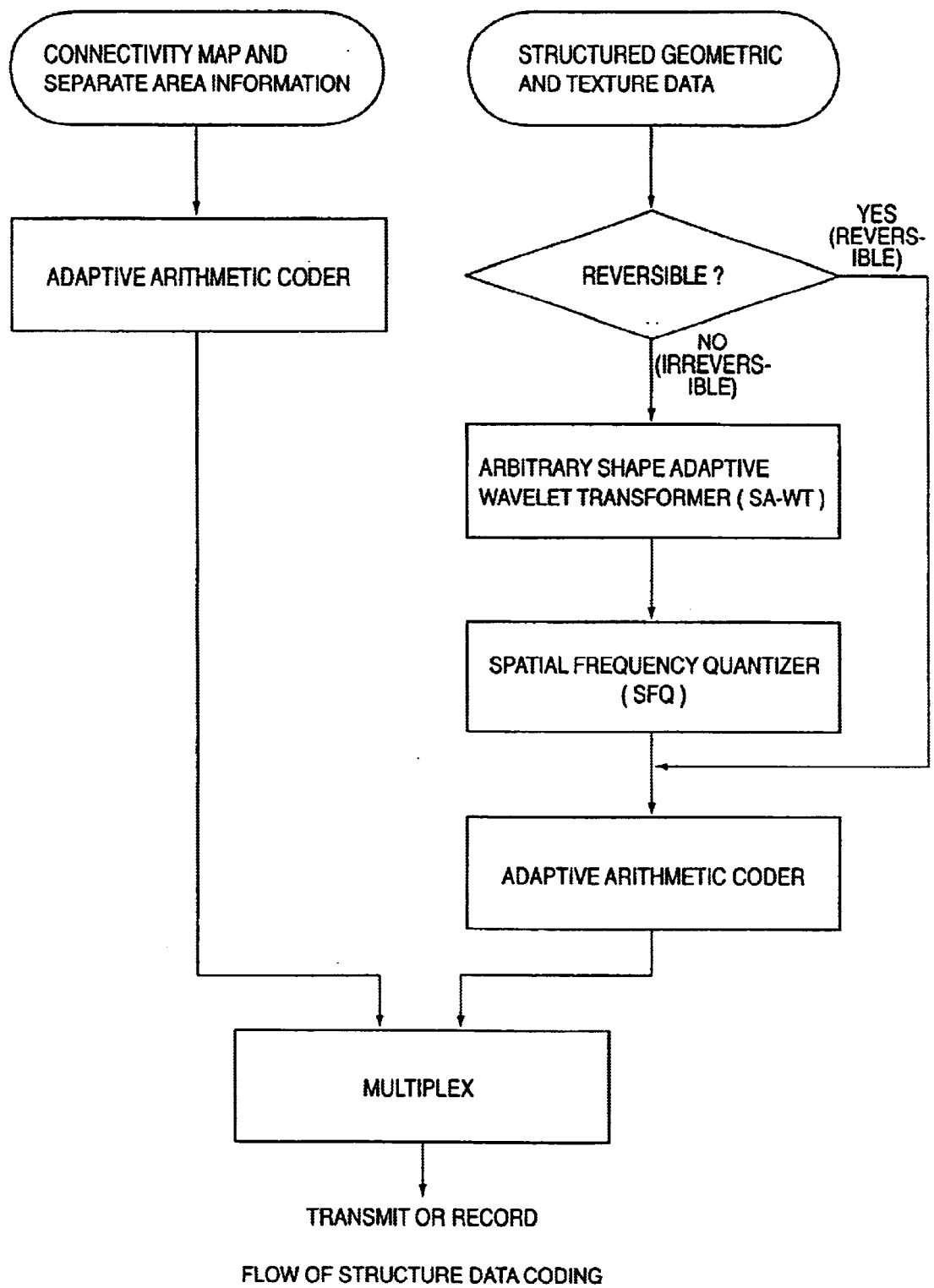
FIG. 25 is a flow chart showing the flow of processing in coding structured data according to the first embodiment.

The above connectivity map, separate area information, and structured geometric data and texture data are entropy coded. The connectivity map and separate area information, which indicate connectivity, are encoded in lossless compression to maintain the neighboring information of the vertices. An adaptive arithmetic coder is used for this processing. Reversible or irreversible coding is used for the structured geometric information and texture information depending on the application. For reversible coding, an adaptive arithmetic coder can be used. For irreversible coding, a method based on a combination of arbitrary shape wavelet transform and a space/frequency quantizer can be used. This processing can be implemented according to the flow chart shown in FIG. 25.

5. Reconstruction of Polygonal Mesh Data

Figure 26:
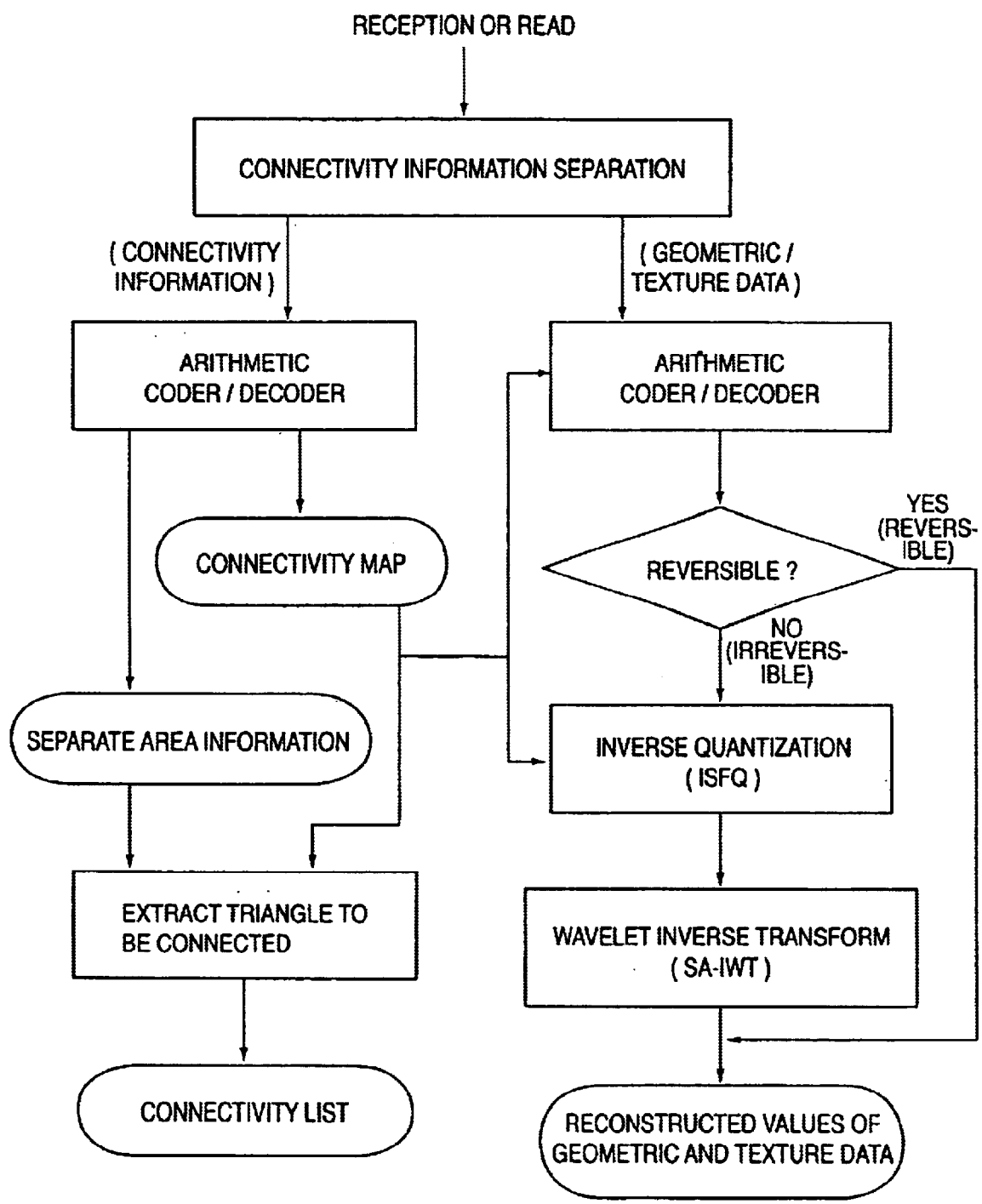
FIG. 26 is a flow chart showing the flow of reconstruction processing of polygonal mesh data according to the first embodiment.

A method of reconstructing a polygonal mesh from a structured data sequence will be described below. As shown in FIG. 26, first of all, a connectivity map and separate area information, which provide connectivity information, are decoded without any loss by the arithmetic decoder. The values or quantized values of geometric and texture data are decoded by using the obtained connectivity map. In the case of irreversible coding, geometric and texture values are obtained by using inverse quantization and wavelet inverse transform.

A method of reconstructing a connectivity list from a connectivity map and separate area information will be described below. FIG. 27A shows the decoded connectivity map and separate area information. FIG. 27B shows a vertex assignment table in which vertex numbers are assigned to representative nodes in the raster scanning order.

FIG. 28A shows reconstructed geometric data. FIG. 28B shows reconstructed texture data.

In the vertex assignment table shown in FIG. 27B, triangles forming a polygon are extracted in a case where the three vertex numbers of a triangle formed by adjacent nodes indicated by dashed lines are different. FIG. 29 shows a list of vertex numbers of triangles extracted from t(u, v) and geometric and texture data of the respective vertices.

As has been described above, according to the present invention, large-scale data compression of polygonal mesh data, which can realize rendering that reflects user's intention, can be achieved.

As many apparently widely different embodiments of the present invention can be made without departing from the spirit and scope thereof, it is to be understood that the invention is not limited to the specific embodiments thereof except as defined in the appended claims.

What is claimed is:

1. A structured polygonal mesh data forming method of approximating a 3D surface shape with a polygonal mesh constituted by a plurality of polygons and forming 2D structured geometry and property data applicable of efficient compression/decompression from connectivity information of the polygonal mesh, comprising the steps of:

forming a vertex assignment table by assigning vertices constituting the polygonal mesh to nodes as lattice points on a 2D coordinate system to maintain neighboring relations among adjacent polygons on a 2D lattice plane; and forming the 2D structured geometry and property data from the vertex assignment able that indicates correspondences between the respective vertices and the respective nodes on the 2D lattice plane, wherein the step of forming the vertex assignment table performs an assigning processing which allows to assign a vertex of the polygon mesh to a plurality of nodes on the 2D coordinate system.

2. The method according to claim 1, wherein the 2D structured geometry and property data comprises geometry data consisting of position coordinate data of the respective assigned polygon vertices, property data including color and normal vector information of each vertex, and a connectivity map which is information about connection between the respective vertices.

3. The method according to claim 1, further comprising the coding step of coding the 2D structured data.

4. The method according to claim 3, wherein the coding step is the step of encoding a connectivity map, which is obtained from the vertex assignment table, in lossless compression.

5. The method according to claim 1, wherein the polygon consists of connected triangles.

6. The method according to claim 2, wherein the color information is color information for reproducing a color of each vertex.

7. The method according to claim 1, further comprising a structuring step of converting the vertex assignment table into a connectivity map.

8. The method according to claim 7, wherein the structuring step is the step of assigning a polygon vertex to a plurality of nodes, if the plurality of nodes with the same assigned vertex are linked on the 2D coordinate system, selecting one representative node from the nodes with the same vertex, and representing positions of the nodes with the same vertex which are not selected as the representative node by relative positions to the representative node, thereby structuring the connectivity information.

9. The method according to claim 1, further comprising the step of compressing the 2D structured data.

10. A structured polygonal mesh data forming apparatus for approximating a 3D surface shape with a polygonal mesh constituted by a plurality of polygons and forming 2D structured geometry and property data applicable of efficient compression/decompression from connectivity information of the polygonal mesh, comprising:
    means for forming a vertex assignment table by assigning vertices of the polygonal mesh to nodes as lattice points on a 2D coordinate system to maintain neighboring relations among adjacent polygons on a 2D lattice plane; and
    means for forming the 2D structured geometry and property data from the vertex assignment table which indicates correspondences between the polygon vertices and the nodes on the 2D lattice plane,
    wherein the means for forming the vertex assignment table performs an assigning processing which allows to assign a vertex of the polygon mesh to a plurality of nodes on the 2D coordinate system.

11. The apparatus according to claim 10, wherein the 2D structured geometry and property data comprises
    geometry data consisting of position coordinate data of the respective assigned polygon vertices,
    property data including color and normal vector information of each vertex, and
    a connectivity map which is information about connection between the respective vertices.

12. The apparatus according to claim 10, further comprising coding means for coding the 2D structured data.

13. The apparatus according to claim 12, wherein said coding means is means for encoding the connectivity map, which is obtained from the vertex assignment table, in lossless compression.

14. The apparatus according to claim 10, wherein the polygon consists of connected triangles.

15. The apparatus according to claim 11, wherein the color information is color information for reproducing a color of each vertex.

16. The apparatus according to claim 10, further comprising structuring means for converting the vertex assignment table into a connectivity map.

17. The apparatus according to claim 16, wherein the structuring means is means for assigning a polygon vertex to a plurality of nodes, if the plurality of nodes with the same assigned vertex are linked on the 2D coordinate system, selecting one representative node from the nodes with the same vertex, and representing positions of the nodes with the same vertex which are not selected as the representative node by relative positions to the representative node, thereby structuring the connectivity information.

18. The apparatus according to claim 10, further comprising means for compressing the 2D structured data.

19. A computer-readable memory storing program codes for approximating a 3D surface shape with a polygonal mesh constituted by a plurality of polygons and forming 2D structured geometry and property data applicable of efficient compression/decompression from connectivity information concerning the polygonal mesh, the program codes comprising:
    a code for executing the step of forming a vertex assignment table by assigning polygon vertices constituting the polygonal mesh to nodes as lattice points on a 2D coordinate system to maintain neighboring relations among adjacent polygons on a 2D lattice plane; and
    a code for executing the step of forming the 2D structured geometry and property data from the vertex assignment table that indicates correspondences between the respective vertices and the respective nodes on the 2D lattice plane,
    wherein the code for executing the step of forming the vertex assignment table is a code for executing an assigning processing which allows to assign a vertex of the polygon mesh to a plurality of nodes on the 2D coordinate system.

* * * * *

UNITED STATES PATENT AND TRADEMARK OFFICE
CERTIFICATE OF CORRECTION

PATENT NO. : 6,791,543 B2
DATED : September 14, 2004
INVENTOR(S) : Akira Kawanaka It is certified that error appears in the above-identified patent and that said Letters Patent is hereby corrected as shown below:

<u>Title page,</u>
Item [56], References Cited, FOREIGN PATENT DOCUMENTS, add
-- JP            11-073527 A            3/1999 --.

Signed and Sealed this

Twenty-fifth Day of October, 2005

JON W. DUDAS
*Director of the United States Patent and Trademark Office*